(12) United States Patent
Archambault et al.

(10) Patent No.: US 9,946,523 B2
(45) Date of Patent: Apr. 17, 2018

(54) MULTIPLE PASS COMPILER INSTRUMENTATION INFRASTRUCTURE

(75) Inventors: Roch G. Archambault, North York (CA); Yaoqing Gao, North York (CA); Allan R. Martin, Toronto (CA); Mark P. Mendell, Toronto (CA); Raul E. Silvera, Woodbridge (CA); Graham Yiu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 12/830,553

(22) Filed: Jul. 6, 2010

(65) Prior Publication Data

US 2011/0016460 A1    Jan. 20, 2011

(30) Foreign Application Priority Data

Jul. 15, 2009   (CA) ..................................... 2672337

(51) Int. Cl.
*G06F 9/45* (2006.01)
*G06F 11/34* (2006.01)
*G06F 11/36* (2006.01)

(52) U.S. Cl.
CPC ........ *G06F 8/4442* (2013.01); *G06F 11/3466* (2013.01); *G06F 11/3624* (2013.01);
(Continued)

(58) Field of Classification Search
CPC .... G06F 11/348; G06F 9/45516; G06F 8/443; G06F 11/3447; G06F 8/4434; G06F 9/30174; G06F 8/4442
(Continued)

(56) References Cited

U.S. PATENT DOCUMENTS

| 5,815,720 A | * | 9/1998 | Buzbee | ................... G06F 8/443 714/E11.209 |
| 6,047,363 A | | 4/2000 | Lewchuk | |

(Continued)

FOREIGN PATENT DOCUMENTS

| CN | 1466716 | 1/2004 |
| CN | 1716188 | 1/2006 |

(Continued)

OTHER PUBLICATIONS

"CA Application No. 2,672,337 Office Action", dated Aug. 13, 2015, 4 pages.

(Continued)

*Primary Examiner* — Tuan Vu
(74) *Attorney, Agent, or Firm* — DeLizio Law, PLLC (57) ABSTRACT

A code region of an application is instrumented by a multi-pass profiler with first annotations for generating profile data. The application is executed with the first annotations, wherein executing the application with the first annotations generates first profile data for the code region. The multi-pass profiler identifies, from the first profile data, the code region as a delinquent code region. The multi-pass profiler determines second annotations based, at least in part, on the first profile data and the at least one of the first annotations that defines the delinquent code region. The multi-pass profiler instruments, based on the first profile data, a code sub-region of the delinquent code region with the second annotations for generating profile data. The application is executed with second annotations, wherein executing the application with the second annotations generates second profile data for the code sub-region.

17 Claims, 6 Drawing Sheets

(52) U.S. Cl.
  CPC .... *G06F 2201/81* (2013.01); *G06F 2201/865* (2013.01); *G06F 2201/88* (2013.01); *G06F 2201/885* (2013.01)

(58) Field of Classification Search
  USPC ....... 717/116, 130, 131, 138, 140, 151, 158; 712/30, 228; 718/108; 707/100; 719/328
  See application file for complete search history.

(56) References Cited

U.S. PATENT DOCUMENTS

| | | | |
|---|---|---|---|
| 6,149,318 A * | 11/2000 | Chase et al. | 717/131 |
| 6,308,324 B1 * | 10/2001 | Roediger et al. | 717/158 |
| 6,427,234 B1 * | 7/2002 | Chambers | G06F 9/45516 717/140 |
| 6,631,518 B1 * | 10/2003 | Bortnikov et al. | 717/158 |
| 6,865,730 B1 * | 3/2005 | Burke et al. | 717/116 |
| 7,120,906 B1 * | 10/2006 | Stephenson | G06F 8/443 717/154 |
| 7,228,404 B1 * | 6/2007 | Patel | G06F 9/30174 712/228 |
| 7,788,657 B2 * | 8/2010 | Wannamaker | G06F 8/4434 717/118 |
| 2004/0054992 A1 * | 3/2004 | Nair | G06F 8/443 717/138 |
| 2004/0268316 A1 * | 12/2004 | Fisher et al. | 717/130 |
| 2007/0180455 A1 * | 8/2007 | Mariani | 719/328 |
| 2007/0214342 A1 * | 9/2007 | Newburn | G06F 11/348 712/216 |
| 2008/0177756 A1 * | 7/2008 | Kosche | G06F 11/3447 |

FOREIGN PATENT DOCUMENTS

| | | |
|---|---|---|
| JP | 08263372 | 10/1996 |
| JP | 2000035894 | 2/2000 |

OTHER PUBLICATIONS

Inagaki, et al., "Automated Cache Hint Annotation Method using Assembly Program Structure", This paper is a revised edition from SACSIS2006 (May 2006), Oct. 2006, pp. 1-8. See Abstract.

* cited by examiner

MULTIPLE PASS COMPILER INSTRUMENTATION INFRASTRUCTURE

This invention was made with Government support under contract HR0011-07-9-0002 awarded by the Defense Advanced Research Projects Agency (DARPA). The government has certain rights to this invention.

RELATED APPLICATIONS

This application claims priority benefit of Canadian Patent Application No. 2672337, titled "Compiler Instrumentation Infrastructure to Facilitate Multiple Pass and Multiple Purpose Dynamic Analysis", having a priority date of Jul. 15, 2009.

BACKGROUND

A compiler is a tool used to convert computer programs written in high level programming languages into machine code executed by one or more central processing units (CPUs) in a computer system. Depending upon how the compiler performs this conversion, the resulting program can execute at different speeds on the computer and/or can require more or less system memory and more or less storage space.

Much work has been done to create compilers which do more than create a direct translation from source code to machine code. Such compilers are typically referred to as optimizing compilers. Optimizing compilers analyze source code and implement strategies that can execute more efficiently on a target computer system. In this context, "optimizing" generally refers to improving the speed or efficiency of a computer program by selectively modifying how the source code is compiled.

While optimizing compilers can employ many techniques such as loop transformation or data remapping to produce efficient machine code, advances in computer hardware have introduced new challenges to compiler designers. Specifically, the clock speed of CPU devices has undergone an increase in recent years, while system memory speeds have lagged behind. Unmanaged, this speed discrepancy (typically referred to as memory latency) causes the CPU to wait idly while data is read from or written to system memory. One optimization strategy used in compilers is to improve cache utilization (and thereby execution time) and reduce the number of cache misses that occur during program execution.

SUMMARY

Some example embodiments include a method comprising configuring one or more processors to perform operations. The operations include a multi-pass profiler instrumenting code region of an application with first annotations for generating profile data. The operations also include executing the application with the first annotations, wherein executing the application with the first annotations generates first profile data for the first code region. The operations include identifying, by the multi-pass profiler, from the first profile data, the first code region as a delinquent code region, wherein the delinquent code region is defined by location of at least one of the first annotations. The operations include determining, by the multi-pass profiler, second annotations based, at least in part, on the first profile data and the at least one of the first annotations that defines the delinquent code region. The operations include instrumenting, by the multi-pass profiler, based on the first profile data, a code sub-region of the delinquent code region with second annotations for generating profile data. The operations also include executing the application with second annotations, wherein said executing the application with the second annotations generates second profile data for the code sub-region.

Some example embodiments include a method for multiple-pass dynamic profiling. The method includes configuring one or more processors to perform operations. The operations include instrumenting, by a multi-pass profiler, a code region of an application with first annotations for generating profile data. The operations include executing the application with the first annotations, wherein executing the application with the first annotations generates first profile data for the code region. Also, the operations include identifying, by the multi-pass profiler, from the first profile data, the first code region as a delinquent code region, wherein the delinquent code region is defined by location of at one of the first annotations, wherein the delinquent code region comprises a code region in which a count of cache misses exceeds a predefined threshold. The operations include determining, by the multi-pass profiler, second annotations based, at least in part, on the first profile data and the at least one of the first annotations that defines the delinquent code region. The operations include instrumenting, by the multi-pass profiler, based on the first profile data, a code sub-region of the delinquent code region with the second annotations for generating profile data. The operations include executing the application with second annotations, wherein executing the application with the second annotations generates second profile data for the code sub-region. The operations also include identifying the code sub-region of the delinquent code region as a delinquent code sub-region, wherein the delinquent code sub-region is defined by location of at least one of the second annotations.

Some example embodiments include a computer program product for multiple-pass dynamic profiling. The computer program product includes a computer readable storage medium having computer readable program code embodied therewith. The computer readable program code is configured to instrument, by a multi-pass profiler, a code region of an application with first annotations for generating profile data. The computer readable program code is configured to execute the application with the first annotations, wherein executing the application with the first annotations generates first profile data for code region. The computer readable program code is also configured to identify, by the multi-pass profiler, from the first profile data, the code region as a delinquent code region, wherein the delinquent code region is defined by location of at least one of the first annotations. The computer readable program code is configured to determine, by the multi-pass profiler, second annotations based, at least in part, on the first profile data and the at least one of the first annotations that defines the delinquent code region. The computer readable program code is configured to instrument, by the multi-pass profiler, based on the first profile data, a code sub-region of the delinquent code region with the second annotations for generating profile data. The computer readable program code is also configured to execute the application with second annotations, wherein said executing the application with the second annotations generates second profile data for the code sub-region.

Some example embodiments include a computer program product for multiple-pass dynamic profiling. The computer program product includes a computer readable storage medium having computer readable program code embodied therewith. The computer readable program code is configured to instrument, by a multi-pass profiler, a code region of an application with first annotations for generating profile. The computer readable program code is configured to execute the application with the first annotations, wherein executing the application with the first annotations generates first profile data for the code region. The computer readable program code is also configured to identify, by the multi-pass profiler, from the first profile data, the code region as a delinquent code region, wherein the delinquent code region is defined by location of at least one of the first annotations, wherein the delinquent code region comprises a code region in which a count of cache misses exceeds a predefined threshold. The computer readable program code is configured to determine, by the multi-pass profiler, second annotations based, at least in part, on the first profile data and the at least one of the first annotations that defines the delinquent code region. The computer readable program code is configured to instrument, by the multi-pass profiler, based on the first profile data, a code sub-region of the delinquent code region with the second annotations for generating profile data. The computer readable program code is configured to execute the application with second annotations, wherein executing the application with the second annotations generates second profile data for the code sub-region. The computer readable program code is also configured to identify the code sub-region of the delinquent code region as a delinquent code sub-region, wherein the delinquent code sub-region is defined by location of at least one of the second annotations.

Some example embodiments include a system that has a processor. The system also include a memory configured to store a program, which when executed by the processor cause the processor to instrument, by a multi-pass profiler, a code region of an application with first annotations for generating profile data. In response to execution of the program, the processor is also configured to execute the application with the first annotations, wherein executing the application with the first annotations generates first profile data for the code region. In response to execution of the program, the processor is to identify, by the multi-pass profiler, from the first profile data, the code region as a delinquent code region, wherein the delinquent code region is defined by location of at least one of the first annotations, wherein the delinquent code region comprises a code region in which a count of cache misses exceeds a predefined threshold. In response to execution of the program, the processor is to determine, by the multi-pass profiler, second annotations based, at least in part, on the first profile data and the at least one of the first annotations that defines the delinquent code region. In response to execution of the program, the processor is to instrument, by the multi-pass profiler, based on the first profile data, a code sub-region of the delinquent code region with the second annotations for generating profile data. Also in response to execution of the program, the processor is to execute the application with second annotations, wherein executing the application with the second annotations generates second profile data for the code sub-region. In response to execution of the program, the processor is to identify the code sub-region of the delinquent code region as a delinquent code sub-region, wherein the delinquent code sub-region is defined by location of at least one of the second annotations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings It is to be noted, however, that the appended drawings illustrate only typical embodiments of this invention and are therefore not to be considered limiting of its scope, for the invention can admit to other equally effective embodiments.

DESCRIPTION OF EMBODIMENTS

Some example embodiments provide a generalized compiler instrumentation infrastructure for multiple pass (i.e., multiple instrumentation cycles) and multiple purpose (i.e., supporting multiple types of profiling, such as cache miss profiling and call-sensitive block count profiling) dynamic profiling. The infrastructure supports multiple pass (or multi-pass) profiling, where later passes can use profile data from previous passes to refine profiling. In some example embodiments, the multi-pass profiler can perform coarse-grained cache miss profiling to identify a delinquent code region. A delinquent code region refers to a code region that yields a number of cache misses greater than an acceptable threshold count of cache misses (which in turn can lead to suboptimal application performance). Similarly, a delinquent memory reference refers to a memory reference that yields a number of cache misses greater than an acceptable threshold count of cache misses. The multi-pass profiler can subsequently perform fine-grained cache miss profiling only on memory references within the delinquent code region. For example, for cache miss profiling, the compiler can first perform coarse grain cache miss profiling to identify a code region which might contains delinquent loads, i.e., a load likely to result in a cache miss, and then perform fine-grain cache miss profiling within that code region to identify individual delinquent loads precisely, i.e., to identify which line of source code includes a memory reference likely to lead to cache misses.

The compiler infrastructure described herein can use multi-pass profiling with static analysis to reduce profiling overhead of an application. Further, the compiler can use a uniform internal representation to annotate delinquent code regions and to map precisely from a low-level representation of code to a high-level representation of the code. Moreover, multiple instrumentation cycles improve interaction between a compiler and profiling tools (such as performance library packages) to reduce profiling overhead and improve optimization results. For example, multiple instrumentation cycles enable application characteristics across different performance counter groups to be profiled. In addition, multiple instrumentation cycles enable different profiling mechanisms, such as block counter profiling, value profiling, and performance counter profiling, to be combined.

Optimization strategies used in compilers can rely on profile data of a program. Profile data can be gathered through compile-time analysis (called static profiling) and/or runtime analysis (called dynamic profiling). Profile-directed feedback (PDF) refers to method of profiling the execution of a program using a representative data sample(s) to generate profile data for the program. The compiler then uses the generated profile data to guide optimizations.

Profiling techniques include control flow profiling, value profiling, and performance counter profiling. Control flow profiling can be further classified into vertex profiling, edge profiling, and path profiling. Vertex profiling measures how many times each basic block of code executes during runtime. A basic block is a sequence of consecutive operations in which flow of control enters at the beginning of the sequence and leaves at the end of the sequence without halt or possibility of branching except at the end of the sequence. Edge profiling measures how many times each branch transition executes during runtime. Path profiling measures how many times each path (i.e., correlated branch) executes during runtime. Value profiling measures invariance, likely values, and range of a variable (e.g., for branch prediction purposes). Performance counter profiling measures hardware performance counters that track specific hardware events, such as cache misses. Typically, a compiler inserts calls to invoke application programming interfaces (APIs) provided by performance library packages. Performance counter profiling can be used to determine application-specific metrics such as cycles per instruction (CPI), floating point operations per second (FLOPS), million instructions per second (MIPS), and cache miss rates.

In the following, reference is made to embodiments. However, it should be understood that the invention is not limited to specific described embodiments. Instead, any combination of the following features and elements, whether related to different embodiments or not, is contemplated to implement and practice the embodiments. Furthermore, although embodiments can achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Some example embodiments are implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; and (ii) writable storage media (e.g., floppy disks within a diskette drive or hard-disk drive) on which alterable information is stored. Such computer-readable storage media, when carrying computer-readable instructions that direct the functions, are in accordance with some example embodiments. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions, are in accordance with some example embodiments. Broadly, computer-readable storage media and communications media can be referred to herein as computer-readable media.

In general, the routines executed to implement the embodiments can be part of an operating system or a specific application, component, program, module, object, or sequence of instructions. The computer program of some example embodiments typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter can be identified based upon the application for which they are implemented in a specific embodiment. However, it should be appreciated that any particular program nomenclature that follows is used merely for convenience, and thus example embodiments should not be limited to use solely in any specific application identified and/or implied by such nomenclature.

Figure 1:
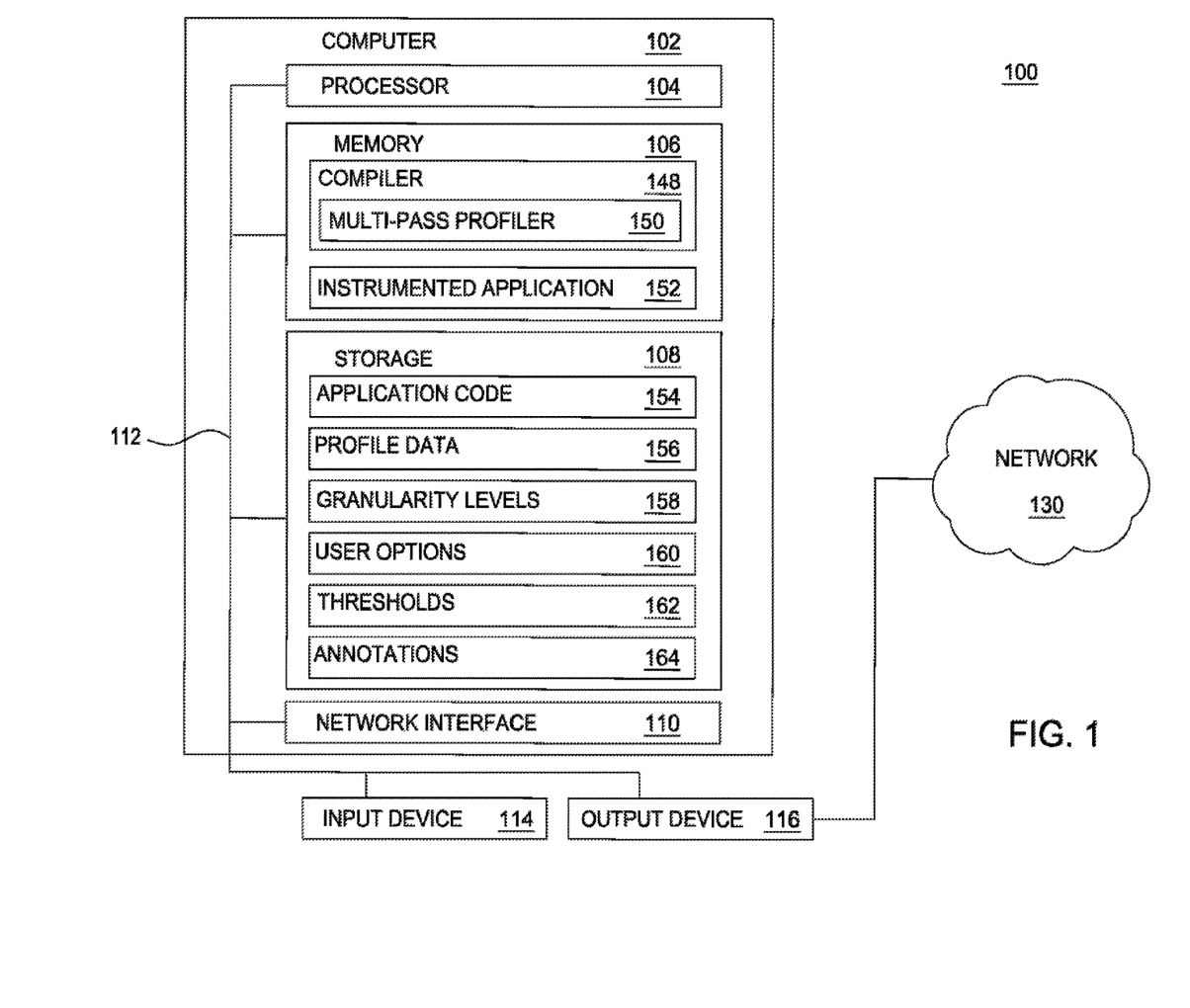
FIG. 1 is a block diagram illustrating a system for optimizing execution of an application, according to some example embodiments.

FIG. 1 is a block diagram illustrating a system 100 for optimizing execution of an application, according to some example embodiments. The networked system 100 includes a computer 102. The computer 102 can be connected to other computers via a network 130. In general, the network 130 can be a telecommunications network and/or a wide area network (WAN). In some example embodiments, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein can be used.

The memory 106 can be a random access memory. While the memory 106 is shown as a single entity, it should be understood that the memory 106 can in fact comprise a plurality of modules, and that the memory 106 can exist at multiple levels, from high speed registers and caches to lower speed but larger Dynamic Random Access Memory (DRAM) chips.

The network interface device 110 can allow network communications between the computer 102 and other computers via the network 130. For example, the network interface device 110 can be a network adapter or other network interface card (NIC).

The storage 108 can be a hard disk drive storage device. Although the storage 108 is shown as a single unit, the storage 108 can be a combination of fixed and/or removable storage devices, such as fixed disc drives, floppy disc drives, tape drives, removable memory cards, or optical storage. The memory 106 and the storage 108 can be part of one virtual address space spanning multiple primary and secondary storage devices.

The input device 114 can be any device for providing input to the computer 102. For example, a keyboard, keypad, light pen, touch-screen, track-ball, or speech recognition unit, audio/video player, and the like can be used.

The output device 116 can be any device for providing output to a user of the computer 102. For example, the output device 116 can be any conventional display screen or set of speakers, along with their respective interface cards, i.e., video cards and sound cards (not shown). Although shown separately from the input device 114, the output device 116 and input device 114 can be combined. For example, a display screen with an integrated touch-screen, a display with an integrated keyboard, or a speech recognition unit combined with a text speech converter can be used.

As shown, the memory 106 of the computer 102 includes a compiler 148 and an instrumented application 152. The compiler 148 includes a multi-pass profiler 150. Further, the storage 108 of the computer 102 includes application code (or simply, code) 154, profile data 156, user options 158, granularity levels 160, thresholds 162, and annotations 164. Code 154 can include source code of an application, object code of the application, and any intermediate compiler representation of the source code. FIGS. 2 through 5 and associated descriptions detail the structure and operation of the multi-pass profiler 150 running on the computer 102.

Although embodiments are described herein with reference to a multi-pass profiler 150 that is part of a compiler 148, other embodiments (such as a standalone multi-pass profiler 150, a multi-pass profiler 150 that is part of a linker, and a multi-pass profiler 150 that is both part of a compiler 148 and part of a linker) are broadly contemplated.

Figure 2:
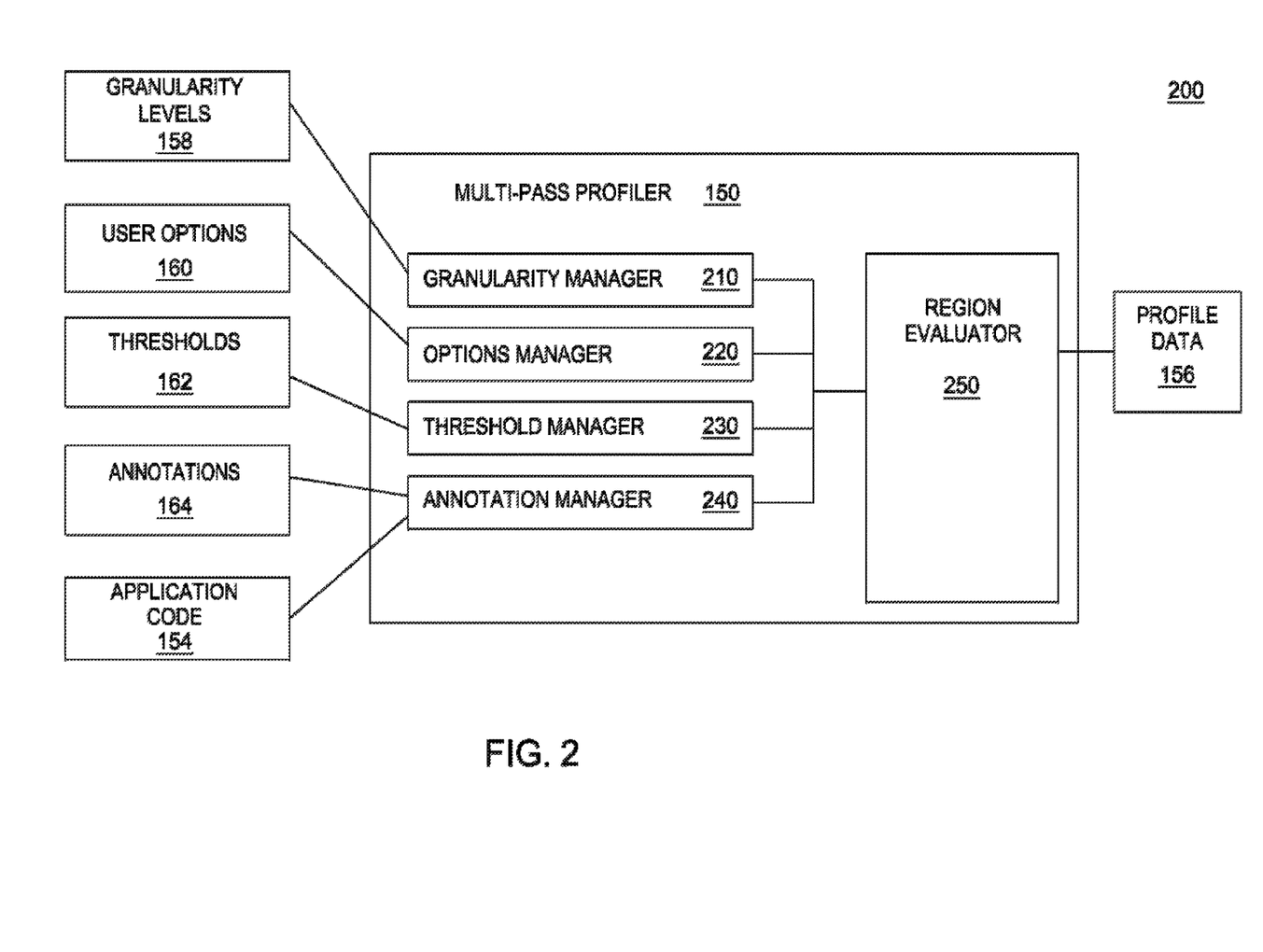
FIG. 2 is a block diagram illustrating components of the multi-pass profiler of FIG. 1, according to some example embodiments.

FIG. 2 is a block diagram 200 illustrating components of the multi-pass profiler 150 of FIG. 1, according to some example embodiments. As shown, the multi-pass profiler 150 includes a granularity manager 210, an options manager 220, a threshold manager 230, an annotation manager 240, and a region evaluator 250.

In some example embodiments, the multi-pass profiler 150 receives the code 154 and instruments the code 154 with annotations 164 (in what can be referred to as a first instrumentation cycle). The compiler 148 can generate an executable based on the annotated code. This executable can be referred to as an "instrumented" executable to distinguish the executable from an executable resulting from un-annotated code. A user can run the instrumented executable (e.g., using a sample data set) to generate the profile data 156. The profile data 156 describes execution characteristics of an application. For example, the profile data 156 generated while the application executes can include a count of cache misses associated with each of a plurality of code regions, based on hardware performance counters. That is, the instrumentation can divide the code 154 into a plurality of code regions for profiling purposes. In some example embodiments, each code region corresponds to a block of code generated by the compiler 148. Each code region can also be mapped to a corresponding block of a higher-level representation of the code (e.g., source code). Further, the plurality of code regions can be identified by evaluating at least one compile unit of the application (e.g., via static analysis). The plurality of code regions can also be referred to herein as a "candidate set" of code regions.

The multi-pass profiler 150 can re-instrument the code 154 based on the profile data 156 (in what can be referred to as a second instrumentation cycle). For example, the multi-pass profiler 150 can identify a "hot" block (e.g., a basic block of code that resulted in a count of cache misses beyond a predefined threshold). In such a case, the multi-pass profiler 150 can instrument a plurality of memory references within the identified hot block using the annotations 164. The compiler 148 can generate an instrumented executable based on the re-instrumented code. A user can run the instrumented executable to generate additional profile data 156 that describing execution characteristics of an application at an increased level of detail (e.g., at a memory reference level of an identified hot block, rather than at a basic block level).

The multi-pass profiler 150 can further re-instrument the code 154 based on the newly generated profile data 156. The multi-pass profiler 150 can perform any number of instrumentation cycles to further refine the annotated code based on additional profile data 156. By providing a plurality of instrumentation cycles (thereby supporting incremental and iterative dynamic profiling), the multi-pass profiler 150 can identify delinquent code regions in a flexible and efficient manner. For example, the multi-pass profiler 150 can profile only memory references within identified delinquent code regions (as opposed to all memory references in the code 154), thereby reducing profiling overhead.

In some example embodiments, different types of hardware performance event information are collected in different sample runs. Multiple-pass dynamic profiling of the code 154 enables the code 154 to be optimized based on different types of hardware performance event information (i.e., one type for each sample run). Further, multiple-pass dynamic profiling of the code 154 enables cumulative profiling, in which profile data 156 from one or more previous runs can be used to refine subsequent profiling. Further still, multiple-pass dynamic profiling of the code 154 efficiently identifies code regions for optimization without excessive instrumentation (e.g., instrumenting all of the code 154). Excessive instrumentation can impair usefulness (i.e., for profiling purposes) of observed application behavior. For example, the additional time and space requirements of an excessively instrumented application can lead to application behavior that is less representative of (i.e., that less accurately reflects behavior of) the uninstrumented application.

In some example embodiments, the granularity manager 210 defines a plurality of granularity levels 158 at which to profile application code 154. Code 154 can include source code of an application, object code of the application, and any intermediate compiler representation of the source code. In some example embodiments, the granularity manager 210 can define the plurality of granularity levels 158 based on user input (e.g., via the input device 114). Table I shows an example granularity levels 158:

TABLE I

Granularity levels example

| Granularity level | Profiling unit | Description |
| --- | --- | --- |
| 1 | Basic block | Coarse-grained |
| 2 | Memory reference | Fine-grained |

In this specific example, the granularity manager 210 defines two granularity levels 158. The granularity levels 210 include a first granularity level (named "coarse-grained") for profiling basic blocks of code 154 and a second granularity level (named "fine-grained") for profiling individual memory references of code 154. Each granularity level 158 can refer to any unit of code (e.g., of source code, of object code, of an intermediate compiler representation, etc.). For example, a granularity level can specify "Procedure" as a profiling unit (thereby designating that each procedure in the code 154 can be individually profiled).

The multi-pass profiler 150 can instrument code 154 differently using annotations 164, based on a selected granularity level 158. For example, if a user selects coarse-grained profiling, the multi-pass profiler 150 can instrument the code 154 by inserting annotations 164 at the beginning and at the end of each basic block of the code 154. Each annotation can provide a function call to provide profile data when the code 154 is compiled, linked, and executed. For example, to profile a cache miss for each basic block of the code 154, the multi-pass profiler 150 can: (i) instrument the beginning of each basic block with an annotation that provides a function call to signal the beginning of the respective basic block (e.g., a function named _pdf_profile_PM_start( ) and (ii) instrument the end of each basic block with an annotation that provides a function call to signal the end of the respective basic block (e.g., a function named _pdf_profile_PM_end( ). Further, if a user selects fine-grained profiling, the multi-pass profiler 150 can instrument the code 154 by inserting annotations 164 for each memory reference of the code 154. In such a case, the multi-pass profiler 150 can instrument each memory reference with an annotation that provides a marker to signal a location of the respective memory reference to profile (e.g., a function named _pdf_profile_cache_miss( ). The annotations 164 are described further below in conjunction with the annotation manager 240.

In some example embodiments, the options manager 220 allows users to configure multiple-pass dynamic profiling of an application. Table II shows exemplary user options 160:

TABLE II

User options example

| Option | Description | Condition |
|---|---|---|
| 1 | Remove profiling annotations | -qnopdf (the default value for the option) |
| 2 | Coarse-grained profiling | -qpdf1 and no previous profile data exists |
| 3 | Fine-grained profiling | -qpdf1 and previous profile data exists |
| 4 | Optimize executable | -qpdf2 |

In this specific example, the options manager 220 defines four user options 160 for configuring multiple-pass dynamic profiling. The options manager 220 can also associate each user option 160 with a condition for applying a user option 160. As shown, the user options 160 include an option for removing profiling annotations (i.e., when a user provides a -qnopdf flag to the compiler 148). The user options 160 also include an option for performing coarse-grained profiling (i.e., when a user provides a -qpdf1 flag to the compiler 148 and no previous profile data 156 is available). And an option for performing fine-grained profiling (i.e., when a user provides a -qpdf1 tag to the compiler 148 and previous profile data 156 is available). Lastly, the options 160 include an option for optimizing an executable using the profile data 156 (i.e., when a user provides a -qpdf2 flag to the compiler 148). Those skilled in the art will recognize that some example embodiments can be adapted to support other user options and conditions.

In some example embodiments, the threshold manager 230 defines at least one threshold 162 for optimizing execution of an application. For example, the threshold manager 230 can allow a user to specify how information obtained from one pass at profiling the application should be used to modify how the application is instrumented (and therefore profiled) in subsequent passes. Table III shows an example of thresholds 162:

TABLE III

Thresholds example

| ID | Description | Condition |
|---|---|---|
| 1 | Delinquent code region | >200 cache misses from a code region |
| 2 | Delinquent memory reference | >75 cache misses from a memory reference |

In this specific example, two thresholds 162 have been specified for optimizing an application, one for code regions and one for individual memory references. First, a threshold of two hundred cache misses is used to identify a code region as being delinquent, wherein the code regions can include, e.g., a block of code generated by the compiler or a source-code level procedure, function, method, module, etc. Second, a threshold of 75 cache misses is used to identify a memory reference as being delinquent. In some example embodiments, different regions of code are profiled to identify broad regions where cache misses occur in the complied executable (according to the code region threshold). Once identified, the cause of the cache misses can be localized using successively fine-grained profiling (according to the memory reference threshold).

In some cases, a small number of memory references can be responsible for a large percentage of overall cache misses. The large number of cache misses can significantly degrade performance of the executing application. Identifying delinquent code regions can allow the compiler 148 to better optimize an application. For example, the compiler 148 can generate executable code employing data prefetching and data reorganization techniques to the delinquent code regions (or more particularly, to the delinquent memory references). Thus, the multi-pass profiler 150 can evaluate profile data 156 from executing an instrumented application 152 to identify subsets of the code 154 to optimize to reduce cache misses.

In some example embodiments, the annotation manager 240 defines a plurality of annotations 164 and instruments the code 154 with the defined plurality of annotations 164. Table IV shows an example of annotations 164:

TABLE IV

Annotations example

| ID | Annotation type | Annotation |
|---|---|---|
| 1 | High-level | unsigned int ___pdf_profile_PM_start( ) |
| 2 | High-level | unsigned int ___pdf_profile_PM_end( ) |
| 3 | High-level | void * ___pdf_profile_cache_miss( ) |
| 4 | Low-level | void ___profile_cache_miss( ) |
| 5 | Low-level | void ___pdf_get_data( ) |
| 6 | Optimizing | void ___mem_delay( ) |
| 7 | Optimizing | void ___expect_value( ) |

In this specific example, the annotation manager 240 defines six annotations 164. Each annotation provides a function call for profiling data during execution of the complied code. In this example, the annotations 164 include high-level annotations, low-level annotations, and optimization annotations, according to some example embodiments. In some example embodiments, a low-level compiler can convert the function calls to inline sequences of executable instructions. The high-level annotations can provide function calls to a high-level optimizer interface to profile a memory reference in a high-level programming language (e.g., in source code of the application or in an intermediate compiler representation thereof). The low-level annotations can provide function calls to a low-level optimizer interface to profile a particular memory reference (e.g., in source code of the application or in an intermediate compiler representation thereof). For example, the annotation manager 240 can convert high-level annotations to low-level annotations during low-level code generation (e.g., during generation of a low-level intermediate representation based on a high-level intermediate representation). That is, the annotation manager 240 can associate a low-level annotation with low-level code (such as a delinquent memory reference, such as in a load or store operation) that corresponds to high-level code (such as a delinquent statement) having a high-level annotation. In other words, high-level annotations and low-level annotations can be maintained across various compilation and optimization phases (i.e., that involve different levels of code representation). Further, the compiler 148 can optimize the code 154 based on the optimizing annotations. In other words, the optimizing annotations can serve as "hints" to a compiler.

The low-level annotations can provide a function call to void _profile_cache_miss( ) having a formal parameter list including a memory address (e.g., void *addr), a counter address (e.g., long long *counter), a load or store operation (e.g., unsigned int LoadStoreType), a memory reference type (e.g., unsigned int dataType), and a memory reference length (e.g., unsigned int length). This method can perform the following operations: (i) read a performance counter, (ii) perform a LoadStoreType operation with the specified dataType and length, (iii) read the performance counter again and check if the performance counter has been increased by one, and (iv) if so, update counter by adding one (otherwise, return). More simply, the low-level annotations can gather profile data (e.g., a count of cache misses for a code region or code sub-region) during execution of an application. In some example embodiments, the compiler 148 can generate a code segment for reading performance counters directly, to reduce profiling overhead. For example, the compiler 148 can convert the function calls to inline sequences of executable code.

The high-level annotations can provide two function calls for performing coarse-grained profiling: unsigned int _pdf_profile_PM_start( ) and unsigned int _pdf_profile_PM_end( ) according to some example embodiments. These methods can have a formal parameter list that includes an event type (e.g., unsigned int eventType). For example, during a first pass through the multi-pass profiler 150, the multi-pass profiler 150 can identify a plurality of regions of the code 154 for which to perform coarse-grained cache miss profiling. The multi-pass profiler 150 can enclose each of the identified plurality of regions within _pdf_profile_PM_start( ) and _pdf_profile_PM_end( ) annotations (e.g., at the beginning and end of each region, respectively). During a second pass through the multi-pass profiler 150, if a user supplies the -qnopdf flag, the multi-pass profiler 150 can remove all _pdf_profile_PM_start( ) and _pdf_profile_PM_end( ) annotations from the code 154. However, if the user supplies the -qpdf1 flag, the multi-pass profiler 150 can convert the _pdf_profile_PM_start( ) and _pdf_profile_PM_end( ) annotations into annotations for invoking methods of a performance metrics API. Further, if the user supplies the -qpdf2 flag, the multi-pass profiler 150 can convert high-level annotations of _pdf_profile_PM_start( ) and _pdf_profile_PM_end( ) into low-level _mem_delay( ) calls.

The high-level annotations can also provide a function call for performing fine-grained cache miss profiling: void * _pdf_profile_cache_miss( ) The method can have a parameter list that includes a sequence number for internal mapping (e.g., unsigned int sequenceNumber), a memory address (e.g., void *addr), a load or store operation (e.g., unsigned int LoadStoreType), a memory reference type (e.g., unsigned int dataType), and a memory reference length (e.g., unsigned int length). For example, during a first pass through the multi-pass profiler 150, the multi-pass profiler 150 can identify a plurality of instructions in the code 154 for which to perform fine-grained cache miss profiling. Each instruction can reference a memory address. The multi-pass profiler 150 can insert a _pdf_profile_cache_miss( ) annotations for each of the identified instructions (e.g., for a memory load reference if LoadStoreType is zero, or for a memory store operation if LoadStoreType is one). During a second pass through the multi-pass profiler 150, if a user supplies the -qnopdf flag, the multi-pass profiler 150 can remove all _pdf_profile_cache_miss( ) annotations from the code 154. However, if the user supplies the -qpdf1 flag, the multi-pass profiler 150 can convert the _pdf_profile_cache_miss( ) annotations into the low-level _profile_cache_miss( ) annotations. Further, if the user supplies the -qpdf2 flag, the multi-pass profiler 150 can convert high-level _pdf_profile_cache_miss( ) annotations into low-level _mem_delay( ) annotations.

Illustratively, the optimizing annotations include a memory delay annotation. The memory delay annotation can provide a function call to void_mem_delay( ) having a formal parameter list of a memory reference address (e.g., void *addr) and a number of delay cycles expected (e.g., unsigned int delayCycles). The memory delay annotation specifies where cache misses can likely occur (e.g., based on the profile data 156). For example, a memory delay annotation can specify an address of an instruction in the code 154 (or in an intermediate compiler representation of the code 154) corresponding to a delinquent memory reference of executable code (i.e., machine code) of the application. Nevertheless, the compiler 148 can retain discretion over what (if any) optimizations to introduce to the code 154 based on the memory delay annotations. In other words, memory delay annotations of the code 154 serve as "hints" to a compiler for optimizing the application.

The optimizing annotations can also include an expected value annotation, according to some example embodiments. The expected value annotation can provide a function call to void_expect_value( ) having a formal parameter list of an expected value (e.g., int expectedValue). The expected value annotation specifies a likely value of an expression, so that the compiler 156 can make optimization tradeoffs (such as in branch prediction) in favor of the expression having the expected value.

In some example embodiments, the region evaluator 250 instruments a plurality of regions (or sub-regions) of the code 154 based on the annotations 164 and the profile data 156 (once profile data is available following an initial pass). For instance, the region evaluator 250 can evaluate the profile data 156 against the thresholds 162 of Table III to determine a plurality of regions of the code 154 to instrument—and whether to use high-level (for a coarse grained analysis) or low-level annotations (for a fine-grained analysis)

Figure 3:
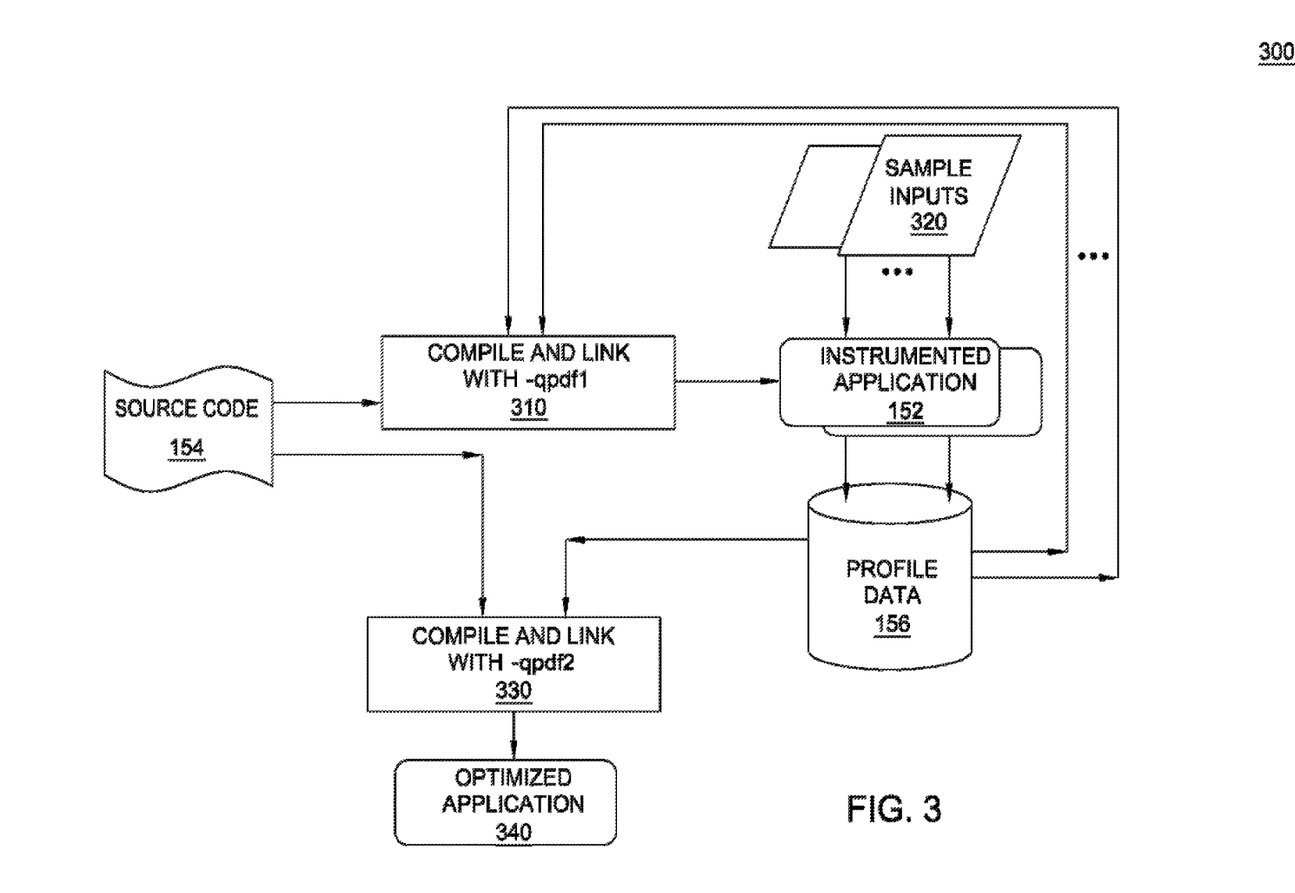
FIG. 3 is a flowchart depicting a method for optimizing execution of an application from a perspective of a user, according to some example embodiments.

FIG. 3 is a flow diagram illustrating a method 300 for optimizing execution of an application, according to some example embodiments. As shown, the method 300 begins at step 310, where a user compiles and links the source code 154 using, e.g., a -qpdf1 compiler flag to indicate that profiling should occur. In response, the multi-pass profiler 150 can instrument the code with annotations for coarse-grained profiling as part of the compilation process. A user then executes one or more sample runs of the instrumented application 152 using a representative data set, such as sample inputs 320. The instrumented application 152 generates profile data 156 as it executes, e.g., the application records the number of cache misses. After executing one or more sample runs of the instrumented application 152 using a representative data set, the user can re-compile and re-link the source code 154 with the -qpdf1 compiler flag by returning to step 310. In response, at step 310, the multi-pass profiler 150 instruments the code with annotations for fine-grained profiling, based on the results of the coarse grained profiling. The user can continue profiling and executing the instrumented application 152 (using multiple sample data sets).

After executing one or more sample runs of the instrumented application 152 using a representative data set, the user can re-compile and re-link the source code 154 with the -qpdf2 compiler flag by proceeding to step 330. At step 330, the compiler 148 can generate an optimized application 340 based on available profile data 156 and annotations 164 (e.g., by generating_mem_delay( ) calls). Further, the compiler 148 generates an optimized application 340. After step 330, the method 300 terminates.

Figure 4:
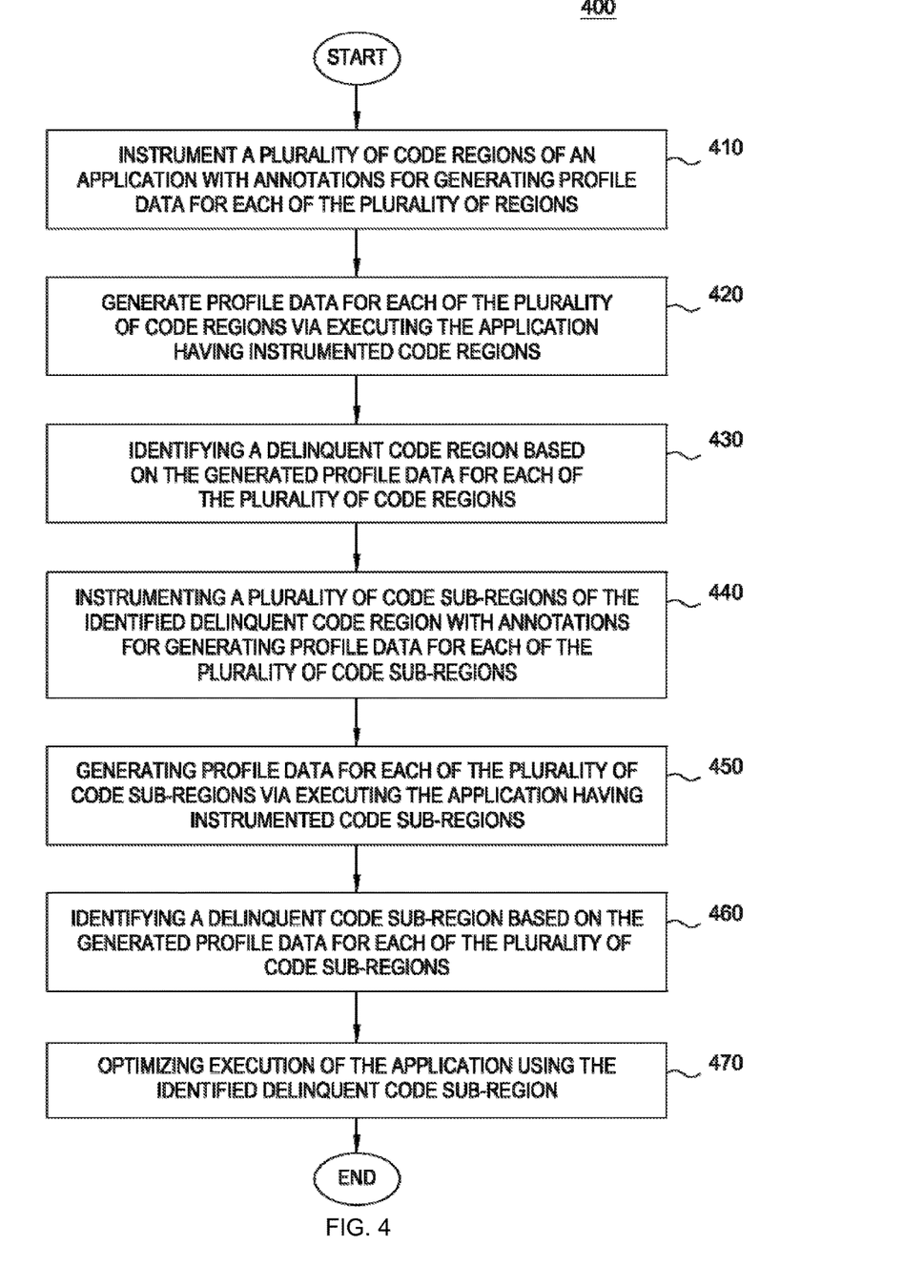
FIG. 4 is a flowchart depicting a method for optimizing execution of an application, according to some example embodiments.

FIG. 4 is a flowchart depicting a method 400 for optimizing execution of an application, according to some example embodiments. As shown, the method 400 begins at step 410, where the multi-pass profiler 150 instruments a plurality of code regions of an application with annotations for generating profile data for each of the plurality of regions. For example, the multi-pass profiler 150 can instrument a plurality of basic blocks of the code 154 to capture profile data when the compiled code is executed. At step 420, the instrumented application generates (via execution of the instrumented, compiled code) profile data 156 for the code regions. For example, the profile data 156 can include a count of cache misses for each code region, based on hardware performance counters monitored by the instrumented code.

At step 430, the multi-pass profiler 150 identifies a delinquent code region based on the profile data 156 generated during program execution. For example, the multi-pass profiler 150 can evaluate the profile data 156 against a specified threshold. At step 440, the multi-pass profiler 150 instruments a plurality of code sub-regions of the delinquent code region with annotations to capture profile data when the complied code is executed. For example, the multi-pass profiler 150 can instrument memory references in the delinquent code region so that profile data 156 is captured for each memory reference when the compiled code is executed.

At step 450, the application compiled and linked at step 440 is executed. As noted above, during execution, the application generates profile data 156 for each of the plurality of memory references. For example, the profile data 156 can include a count of cache misses for each memory reference, based on hardware performance counters. At step 460, the multi-pass profiler 150 identifies a delinquent code sub-region from the profile data captured for the code sub-regions.

At step 470, the user can direct the compiler to optimize how the code is compiled to address sub-regions of code resulting in cache misses that exceed the threshold. In one embodiment, a user can also manually add annotations (e.g., _mem_delay( ) annotations) to guide compiler optimization. For example, the multi-pass profiler 150 can compile the application based on the identified delinquent code sub-region and the generated profile data 156 to produce an optimized application.

Figure 5:
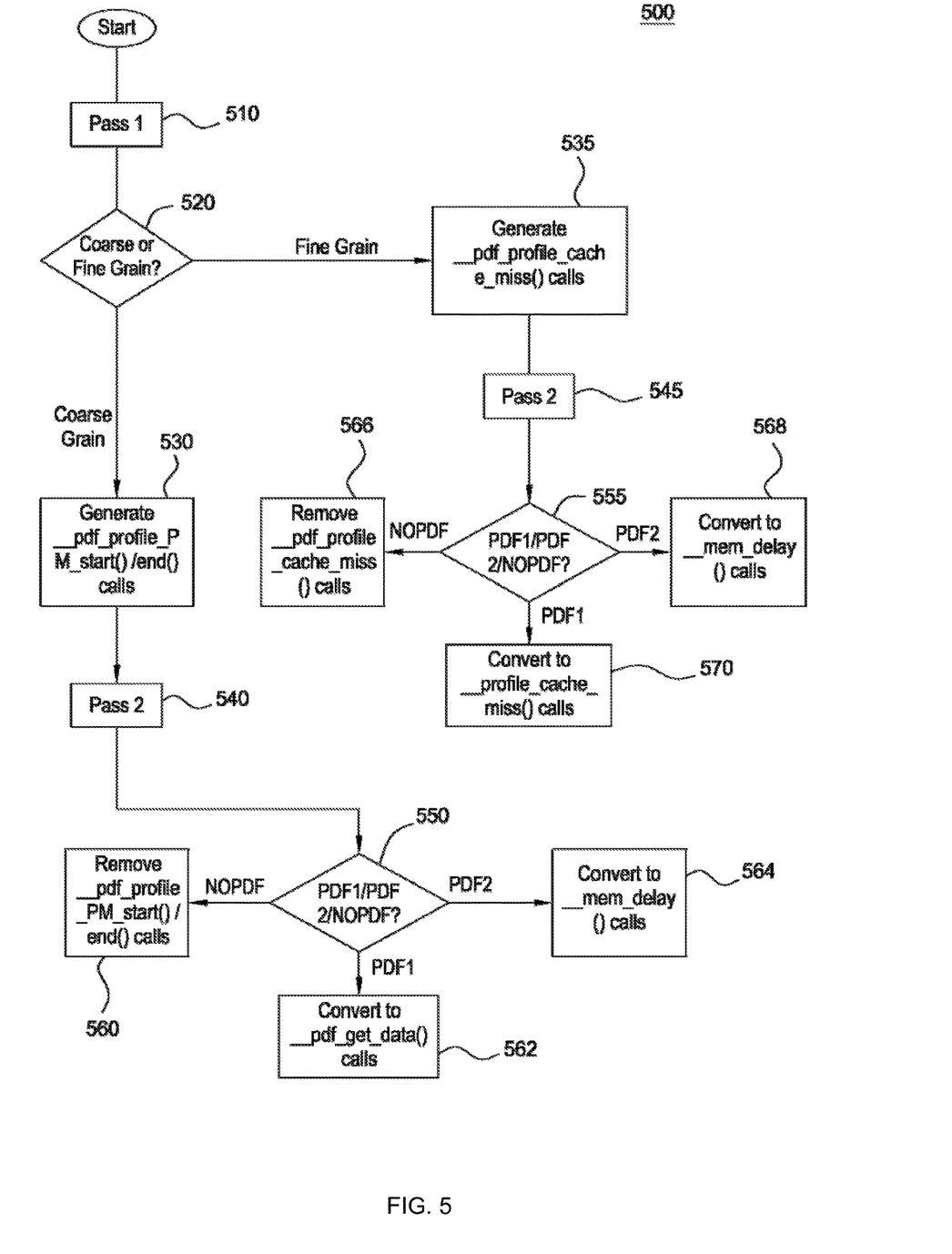
FIG. 5 is a flowchart depicting a method for performing multi-pass dynamic profiling, according to some example embodiments.

FIG. 5 is a flowchart depicting a method 500 for performing multi-pass dynamic profiling, according to some example embodiments. As shown, the method 500 begins at step 510, where a user initiates a first pass through the multi-pass profiler 150. For example, the compiler 148 can receive an instruction to compile and link the application source code which includes a compiler flag directing the compiler to include profiling instrumentation (e.g., using the -qpdf1 flag) in the complied and linked code. At step 520, the multi-pass profiler 150 determines whether coarse-grained profiling or fine-grained profiling should be performed. For example, the multi-pass profiler 150 can evaluate the conditions of Table II. For instance, the multi-pass profiler 150 can evaluate whether profile data is available. If not, the multi-pass profiler 150 can perform an initial pass of dynamic profiling using a coarse-grained approach. Otherwise, the multi-pass profiler 150 can perform additional fine-grained profiling based on profile data obtained from a prior pass of dynamic profiling.

At step 530, if the multi-pass profiler determines to perform coarse-grained profiling, then the multi-pass profiler 150 instruments the code with calls to profiling functions (e.g., _pdf_profile_PM_start( ) and _pdf_profile_PM_end( ). For example, the multi-pass profiler 150 can identify blocks of code and instrument corresponding compile units with calls to profile the compile units as a unified block (e.g., using annotations of Table III). After executing the code against sample data, at step 540, the user initiates a second pass through the multi-pass profiler 150—again specifying a flag to indicate what profiling should be performed in the application. In response, the multi-pass profiler 150 identifies the flag provided by the user. If the flag indicates to not perform profiling (e.g., using the -qnopdf compiler flag), then at step 560, the multi-pass profiler 150 removes the references to the profiling functions (e.g., the _pdf_profile_PM_start( ) and _pdf_profile_PM_end( ) calls). If the flag indicates to continue dynamic profiling (e.g., using the -qpdf1 flag) then at step 562, the multi-pass profiler 150 converts the annotations from step 530 to _pdf_get_data( ) calls (e.g., to merge all previous profile data 156). If the flag is -qpdf2, the method proceeds to step 564, where the compiler 148 generates_mem_delay( ) calls based on the profile data 156 and the annotations. That is, the -qpdf2 flag is used to instruct the compiler 148 to compile and optimize the code 154 based on available profile data 156.

However, if at step 520, the profiler determines that fine-grained profiling should be performed, then at step 535, the multi-pass profiler 150 generates _pdf_profile_cache_miss( ) calls. For example, the multi-pass profiler 150 can annotate the code 154 with corresponding annotations of Table III. At step 545, the user initiates a second pass through the multi-pass profiler 150. For example, the compiler 148 can receive the code 154 and a flag from the user. At step 555, the multi-pass profiler 150 identifies the flag provided by the user. If the flag is -qnopdf (i.e., corresponding to scenario 1 of Table II), the method proceeds to step 566, where the multi-pass profiler 150 removes all _pdf_profile_cache_miss( ) calls from the code 154. If the flag is -qpdf1, the method proceeds to step 568, where the multi-pass profiler 150 converts the annotations from step 535 to _profile_cache_miss( ) calls. If the flag is -qpdf2, the method proceeds to step 570, where the multi-pass profiler 150 converts the annotations from step 535 to _mem_delay( ) calls.

After step 560 or step 566, the compiler 148 can generate an application based only on the code 154. After step 562 or step 570, the compiler 148 can generate an instrumented application 152 based on the code 154 and the annotations from step 562 or step 570, respectively. At step 564 or step 568, the compiler 148 can generate an optimized application based on the code 154 and the annotations from step 564 or step 568, respectively.

The multi-pass profiler 150 can perform instrumentation during compilation (also referred to as compile-step implementation). For example, if a user provides the -qpdf1 flag, the multi-pass profiler 150 can check for previous profile data 156 for the application. If previous profile data 156 exists, the multi-pass profiler 150 can merge all previous profile data 156 and/or use the previous profile data 156 to improve/refine identification of delinquent code regions (e.g., use coarse-grained profile data to perform fine-grained profiling). If a user provides the -qpdf2 flag, the multi-pass profiler 150 can generate annotations such as _mem_delay( ) for a delinquent memory reference and _expect_value( ) for an expression, based on the profile data 156 and the annotations 164 from a previous instrumentation cycle. The compiler 148 can optimize the application based on the generated annotations and the profile data 156. Examples of optimizations include inlining, cloning, outlining, indirect call specialization, delinquent-load-driven data prefetch, data reorganization, instruction scheduling, etc.

The multi-pass profiler 150 can also perform instrumentation following compilation of an application (also referred to as link-step instrumentation). For example, the multi-pass profiler 150 can generate a call graph based on all compile units. If a user provides the -qnopdf flag, the multi-pass profiler 150 can remove all annotations 164 generated during compilation. If a user provides the -qpdf1 flag, the multi-pass profiler 150 can reserve memory for each compile unit and perform memory mapping for each identified code region (or identified code sub-region). The multi-pass profiler 150 can also generate calls for dynamic profiling. Further, the multi-pass profiler 150 can review any optimizations from compilation to remove redundant profiling. The multi-pass profiler 150 can then interface with a low-level optimizer to expand annotations 164 into an instruction sequence or to generate calls to a runtime library. That is, the annotations can be replaced with actual instructions (or calls to functions) that gather the profile data during program execution.

Figure 6:
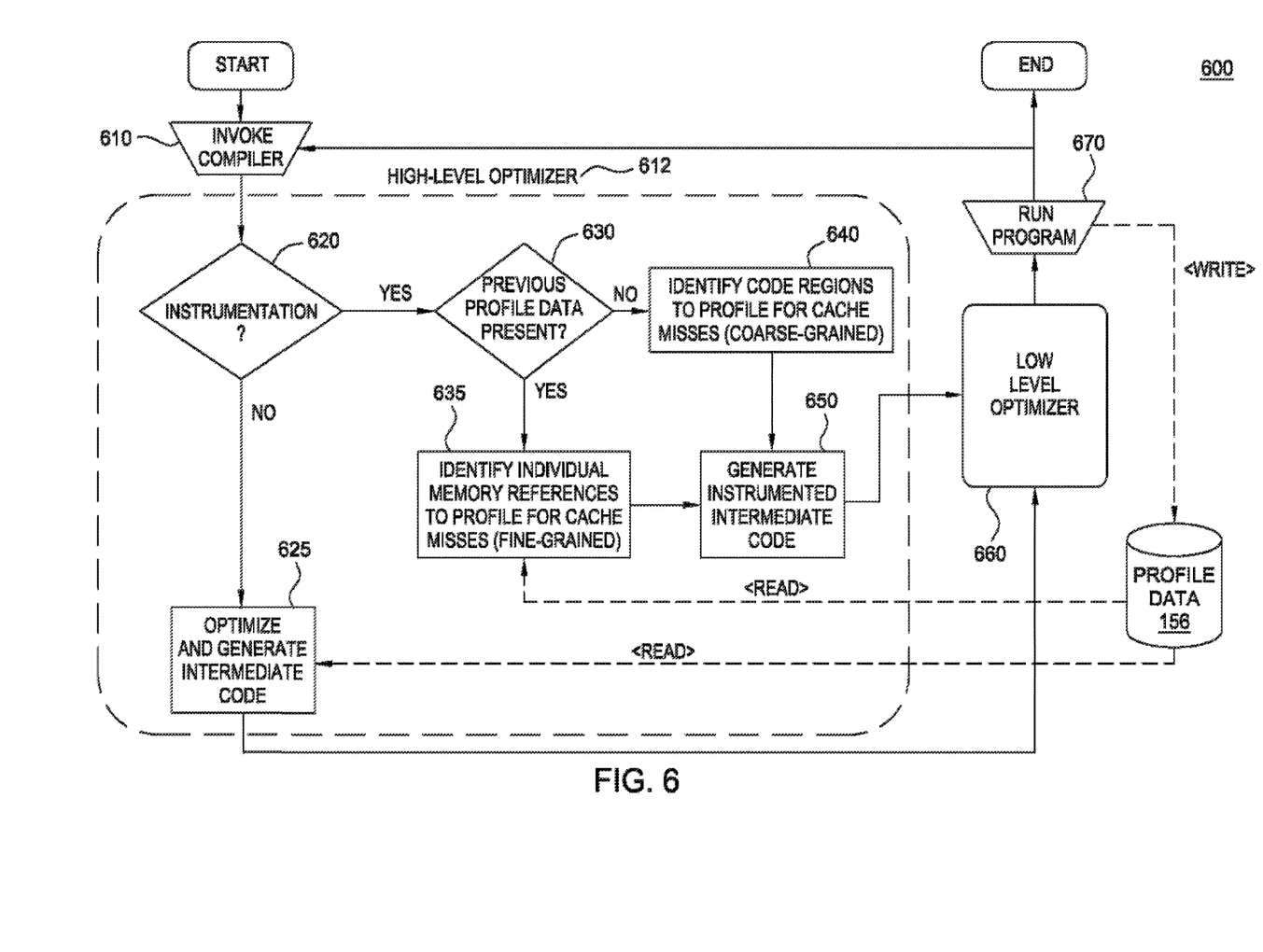
FIG. 6 is a flowchart depicting a method for performing multi-pass dynamic profiling, according to some example embodiments.

FIG. 6 is a flowchart depicting a method 600 for performing multi-pass dynamic profiling, according to some example embodiments. As shown, the method 600 begins at step 610, where a user invokes a compiler 148 to compile source code for an application. Steps 620 through 650 can be performed by a high-level optimizer 612 of the compiler 148, according to some example embodiments. At step 620, the high-level optimizer 612 determines whether the user desires instrumentation. If not, the method 600 proceeds to step 625, where the high-level optimizer 612 optimizes and generates intermediate code for the application, based on the source code and any profile data 156.

However, if the user desires instrumentation, the method 600 proceeds to step 630, where the high-level optimizer 612 determines whether previous profile data 156 exists. If not, the method 600 proceeds to step 640, where the high-level optimizer 612 identifies code regions to profile for cache misses (i.e., performs coarse-grained profiling). However, if previous profile data 156 exists, the method 600 proceeds to step 635, where the high-level optimizer 612 identifies individual memory references to profile for cache misses (i.e., performs fine-grained profiling), based on the profile data 156. After step 640 or step 635, the method 600 proceeds to step 650, where the high-level optimizer 612 generates instrumented intermediate code for the application.

After step 650 or step 625, the method 600 proceeds to step 660, where a low-level optimizer of the compiler 148 generates one or more object files for the application, based on the instrumented intermediate code. After step 660, a linker can link the one or more object files and any libraries to generate a program (i.e., an executable) for the application. At step 670, if the program is an optimized program (i.e., generated from steps 625 and 660), a user can optionally execute the optimized program. However, the optimized program cannot produce profile data 156, according to some example embodiments. That is, if the user decides to compile for the last time (i.e., steps 625 and 660), the "run" step 670 need not be performed. On the other hand, at step 670, if the program is an instrumented program (i.e., generated from steps 650 and 660), a user can execute the instrumented program against sample data to produce profile data 156. After step 670, if the user desires to continue profiling, the method 600 returns to step 610. Otherwise, the method 600 terminates.

Of course, the embodiments described herein are intended to be illustrative and not limiting, and other embodiments are broadly contemplated. Those skilled in the art will recognize, for example, that some example embodiments can be adapted to support other granularity levels, user options, thresholds, and annotations. Further, some example embodiments can be adapted to support other ways of annotating the code. For example, the multi-pass profiler can generate an intermediate representation of the code. The multi-pass profiler can then annotate the intermediate representation of the code, leaving the code itself intact. Further still, some example embodiments can be adapted to support types of profiling other than cache miss profiling, such as block count profiling and value profiling.

Advantageously, example embodiments optimize execution of an application. In some example embodiments, a multi-pass profiler can instrument a plurality of code regions of the application with annotations for generating profile data for each of the plurality of code regions. These annotations can generate profile data for each of the plurality of code regions when a user executes the application having instrumented code regions. The multi-pass profiler can identify a delinquent code region that can be identified based on the generated profile data for each of the plurality of code regions. Further, the multi-pass profiler can instrument a plurality of code sub-regions of the identified delinquent code region with annotations for generating profile data for each of the plurality of code sub-regions. These annotations can generate profile data for each of the plurality of code sub-regions when a user executes the application having instrumented code sub-regions. The multi-pass profiler can identify a delinquent code sub-region based on the generated profile data for each of the plurality of code sub-regions. A compiler can optimize execution of the application using the identified delinquent code sub-region.

While the foregoing is directed to embodiments of the present invention, other and further embodiments of the invention can be devised without departing from the basic scope thereof, and the scope thereof is determined by the claims that follow.

What is claimed is:

1. A method implemented with one or more processors coupled to programmed instructions respectively stored on one or more computer readable storage media, where execution of the respectively stored instructions by the one or more processors causes the method to be performed, comprising:
  instrumenting, by one or more processors executing a multi-pass profiler from a first computer readable storage medium, a code region of an application with first annotations for generating profile data;
  executing, by the one or more processors, the application with the first annotations, wherein executing the application with the first annotations generates first profile data for the code region, the first profile data stored in a second computer readable storage medium;
  identifying, by the one or more processors executing the multi-pass profiler, from the first profile data, a delinquent code region within the code region, wherein the delinquent code region is defined by a location of at least one of the first annotations, wherein the delinquent code region comprises a code sub-region of the code region in which a count of cache misses exceeds a first predefined threshold;
  determining, by the one or more processors executing the multi-pass profiler, second annotations based, at least in part, on the first profile data and the at least one of the first annotations that defines the delinquent code region;
  instrumenting, by the one or more processors executing the multi-pass profiler, based on the first profile data, a code sub-region of the delinquent code region with the second annotations for generating profile data, wherein said instrumenting with the second annotations is finer grained cache miss profiling than said instrumenting with the first annotations, wherein the finer grained cache miss profiling comprises instrumenting each memory reference in the code sub-region associated with cache misses, and wherein the finer grained cache miss profiling identifies one or more lines of the code sub-region likely to lead to a cache miss;
  executing, by the one or more processors, the application with the second annotations, wherein said executing the application with the second annotations generates second profile data for the code sub-region; and
  in response to determining, by the one or more processors executing the multi-pass profiler, that a second count of cache misses associated with a memory reference in the code sub-region exceeds a second predefined threshold, providing, by the one or more processors executing the multi-pass profiler, a compiler hint for one or more lines of the code sub-region associated with the memory reference.

2. The method of claim 1 further comprising identifying the code sub-region of the delinquent code region as a delinquent code sub-region, wherein the delinquent code sub-region is defined by location of at least one of the second annotations.

3. The method of claim 2 further comprising optimizing the delinquent code sub-region based on the second profile data, wherein optimizing the delinquent code sub-region comprises performing at least one of inlining, cloning, outlining, indirect call specialization, delinquent load driven data prefetching, data reorganization, and instruction scheduling.

4. The method of claim 1, wherein the second annotations comprise one or more memory delay annotations.

5. The method of claim 4, wherein the finer grained cache miss profiling identifies one or more lines of the code sub-region likely to lead to the cache miss based on the one or more memory delay annotations specifying an address of an instruction in the code sub-region corresponding to a delinquent memory reference of executable code of the application.

6. The method of claim 5, wherein the one or more memory delay annotations comprise one or more function calls to at least one function that specifies one or more delay cycles expected for one or more delinquent loads from the code sub-region.

7. The method of claim 4, wherein the finer grained cache miss profiling identifies at least two lines of the code sub-region likely to lead to at least two cache misses in response to providing, as the second annotations, markers for each of the at least two lines of the code region, wherein the markers signal locations of memory references in the code sub-region.

8. The method of claim 1 further comprising:
  executing the application with the first annotations on a basic block of code for the code region;
  before determining the second annotations, automatically determining that the first profile data is associated with the basic block of code; and
  selecting, as the code sub-region, only individual memory references of the basic block of code that experienced one or more cache misses.

9. The method of claim 8 further comprising converting a sequence of high-level programming function call statements from the basic block of code associated with the first annotations to an in-line sequence of low-level code operations associated with the second annotations, said in-line sequence of low-level code operations comprising one or more of load or store operations for the memory references.

10. The method of claim 9 further comprising performing one or more optimizing operations after executing the application with the second annotations, wherein the performing the one or more optimizing operations comprises providing an expected value annotation having a formal parameter list of an expected value which specifies a likely value of an expression, wherein the providing the expected value annotation makes optimization tradeoffs in favor of the expression.

11. A computer program product for multiple-pass dynamic profiling, the computer program product comprising:
  a computer readable storage medium having computer readable program code embodied therewith, the computer readable program code configured to
    instrument a code region of an application with first annotations for generating profile data,
    execute the application with the first annotations, wherein executing the application with the first annotations generates first profile data for the code region,
    identify from the first profile data, a delinquent code region within the code region, wherein the delinquent code region is defined by location of at least one of the first annotations, wherein the delinquent code region comprises a code sub-region of the code region in which a count of cache misses exceeds a first predefined threshold,
    determine second annotations based, at least in part, on the first profile data and the at least one of the first annotations that defines the delinquent code region,
    instrument based on the first profile data, a code sub-region of the delinquent code region with the second annotations for generating profile data, wherein instrumenting with the second annotations is finer grained cache miss profiling than instrumenting with the first annotations, wherein the finer grained cache miss profiling comprises instrumenting each memory reference in the code sub-region, execute the application with second annotations, wherein said executing the application with the second annotations generates second profile data for the code sub-region, and in response to a determination that a second count of cache misses associated with a memory reference in the code sub-region exceeds a second predefined threshold, provide a compiler hint for one or more lines of the code sub-region associated with the memory reference.

12. The computer program product of claim 11 further comprising computer program code configured to identify the code sub-region of the delinquent code region as a delinquent code sub-region, wherein the delinquent code sub-region is defined by location of at least one of the second annotations.

13. The computer program product of claim 11, wherein each of the first annotations and second annotations is expanded into annotation code selected from at least one of a function call to a runtime library and an inline sequence of instructions.

14. The computer program product of claim 11, wherein the second annotations comprise one or more memory delay annotations.

15. The computer program product of claim 14, wherein the finer grained cache miss profiling identifies the one or more lines of the code sub-region likely to lead to a cache miss based on the one or more memory delay annotations specifying an address of an instruction in the code sub-region corresponding to a delinquent memory reference of executable code of the application.

16. The computer program product of claim 15, wherein the one or more memory delay annotations comprise one or more function calls to at least one function that specifies one or more delay cycles expected for one or more delinquent loads from the code sub-region.

17. The computer program product of claim 11 further comprising:
 a processor(s) set;
 wherein:
  the computer program product is in the form of a computer system; and
  the processor(s) set is operatively connected to the computer readable storage medium in a manner that permits the processor(s) set to execute the computer readable program code.

* * * * *